Jan. 23, 1923.
T. S. CRAMPTON.
VEGETABLE CUTTER.
FILED MAY 8, 1922.
1,442,861
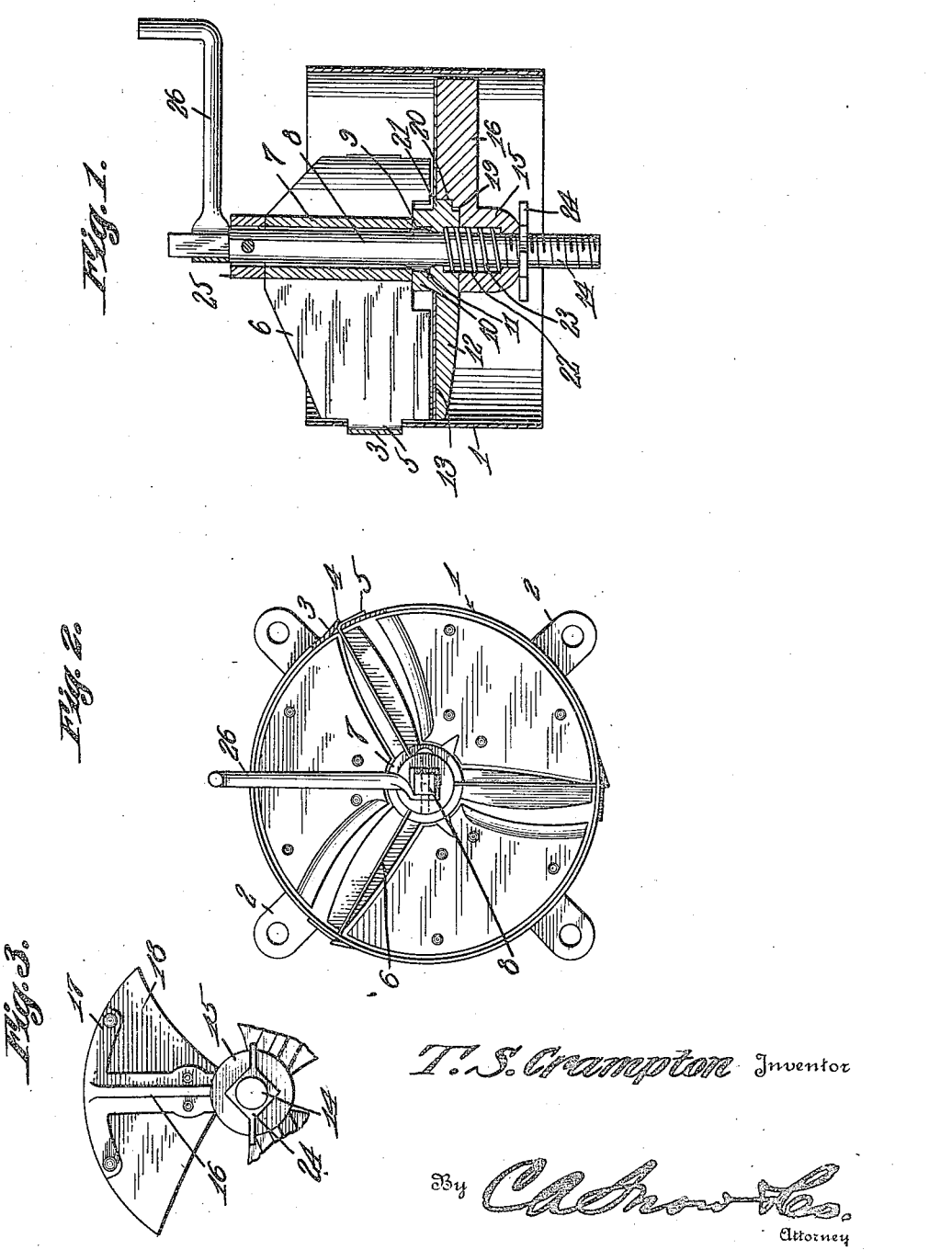

Patented Jan. 23, 1923.

1,442,861

UNITED STATES PATENT OFFICE.

THOMAS S. CRAMPTON, OF STEMMERS RUN, MARYLAND.

VEGETABLE CUTTER.

Application filed May 8, 1922. Serial No. 559,350.

*To all whom it may concern:*

Be it known that I, THOMAS S. CRAMPTON, a citizen of the United States, residing at Stemmers Run, in the county of Baltimore and State of Maryland, have invented new and useful Vegetable Cutters, of which the following is a specification.

This invention relates to a vegetable cutter especially useful in making slaw, sauerkraut and the like although it can be used for cutting all kinds of vegetables into small strips or slices.

It is an object of the invention to provide a device of this character which is cheap to manufacture, the parts of which can be assembled readily, and will not easily get out of order.

Another object is to provide a vegetable cutter the parts of which can be taken apart quickly for the purpose of cleaning or repairing them.

With the foregoing and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings the preferred form of the invention has been shown.

In said drawings

Figure 1 is a central longitudinal section through the cutter.

Figure 2 is a plan view thereof.

Figure 3 is a bottom plan view of a portion of the rotatable cutter.

Referring to the figures by characters of reference 1 designates a cylindrical housing open at its ends and preferably formed at the bottom with outstanding attaching ears 2 whereby the housing can be secured to the top of a container or to a suitable supporting structure on a container. The housing is formed with outstruck portions 3 forming spaced longitudinal slots 4 and these slots are adapted to receive laterally extending wings 5 formed at the outer ends of stationary blades 6 projecting from a hub 7. These blades and the hub cooperate to form a spider and by rotating the spider bodily in a counter-clockwise direction the wings 5 will be withdrawn from the slots 4 and the spider thus be freed from the housing so as to be removed readily. By inserting the spider and turning it in a clockwise direction the parts will be connected by the movement of the wings into the slots. As the housing 1 is formed of thin metal it can yield to any degree necessary to permit this assemblage of the parts.

Journaled within the hub 7 is a shaft 8 having a slightly flattened portion 9. A collar 10 is insertable onto this shaft and has notches 11 therein for receiving the flattened portion 9 so as to hold the collar to the shaft and insure rotation of the parts together. This collar has curved arms 12 extending therefrom and secured on each arm is a cutting blade 13. These blades are all located in the same plane and are designed to work under and close to the stationary blades 6.

One end of the shaft 8 is screw threaded as shown at 14 and insertable onto this threaded portion is a hub 15 from which radiate reenforcing ribs 16 having terminal arcuate wings 17. Secured on these ribs and wings are segmental supporting plates 18 formed of thin sheets of metal, such as tin. The hub 15 is recessed as at 19 to receive the collar 10 and notches 20 are formed in the inner ends of the ribs 12 so as to receive lugs 21 projecting from the collar 10. Thus when these parts are properly assembled they will be held against relative rotation and the arms 12 with the blades 13 will be supported above the spaces between the arcuate plates 18. Recesses 22 are formed in the meeting faces of the hub 15 and the collar 10 and a coiled spring 23 is seated in these recesses. A nut 24 engages the threaded portion 14 of the shaft 8 and is adapted to bear against the hub 15 so as to hold the parts assembled. A collar 25 is fastened to the shaft 8 so as to bear against the hub 7, and any suitable operating means such as a crank arm 26 is secured to the shaft.

The spring 23 provides a yielding support for the collar 10 and arms 12 and when the nut 24 is tightened this spring is placed under compression. The tightening of the nut will force the ribs 16 upwardly against the action of spring 23 and decrease the distance between the planes of the blades 13 and the plates 18. Thus when the blades are rotated a thin cut will be made in the material held between blades 6. By unscrewing the nut 24 the spring 23 will expand and thrust the hub 15 downwardly relative to collar 10, thereby lowering plates 18 and increasing the distance between the planes of the plates 18 and blades 13 and causing a thicker cut to be produced. By having the blades 13 yieldingly supported they can shift downwardly when subjected to extreme resistance, thus avoiding danger of injury to the parts.

What is claimed is:—

1. In a vegetable cutter a housing open at its ends, a spider insertable into the housing and including a central hub, means controlled by the rotation of the spider relative to the housing for connecting or disconnecting the parts, portions of the spider constituting stationary blades of the cutter, a shaft mounted for rotation in the hub of the spider, and movable blades carried by the shaft and cooperating with the stationary blades.

2. A vegetable cutter including a housing, a spider insertable into the housing and comprising a hub, radial blades extending therefrom, and lateral wings on the blades, said wings being shiftable by rotation of the spider into engagement with the housing, a shaft rotatable in the hub, spaced segmental plates rotatable with the shaft, and yieldingly supported cutting blades rotatable with the shaft.

3. A vegetable cutter including a housing, a spider therein including a bearing hub and radial blades, a shaft journaled in the hub, a collar detachably mounted on and rotatable with the shaft, radial arms on the hub, cutting blades secured on the arms and rotatable past the blades of the spider, a second hub detachably mounted on the shaft, reenforcing ribs radiating therefrom, segmental blades secured to the ribs and spaced apart, cooperating means on the collar and ribs for holding them assembled for rotation together, yieldable means engaging the collar for supporting it relative to the last mentioned hub, and adjusting means mounted on the shaft and engaging said hub.

4. In a vegetable cutter a housing, a hub therein, radial blades connecting the hub to the housing, a shaft journaled in the hub and having a threaded portion, another hub mounted on the shaft and adjustable therealong relative to the blades, reenforcing ribs radiating from the adjustable hub, spaced segmental blades secured on the ribs, a collar detachably engaging and rotatable with the adjustable hub, cutting blades connected to said collar and supported above the spaces between the plates, and yielding means housing within the collar and the adjustable hub for supporting said collar and the blades thereof.

5. In a vegetable cutter a housing, a spider therein including a bearing hub and stationary blades, a shaft journaled in the hub, a hub adjustable on the shaft, a supporting spring within the adjustable hub, a collar connected to and rotatable with the shaft and supported by the spring, segmental blades spaced apart and connected to the adjustable hub, cutting blades connected to and movable with the collar and normally supported above the plane of the segmental blades for cooperation with the stationary blades of the spider, and means adjustably engaging the shaft and cooperating with the adjustable collar for regulating the compression of the supporting spring.

In testimony that I claim the foregoing as my own, I have hereto affixed my signature in the presence of two witnesses.

THOMAS S. CRAMPTON.

Witnesses:
HERBERT D. LAWSON.
AGNES ROCKELLI.